(12) United States Patent
Hamazaki et al.

(10) Patent No.: US 10,328,376 B2
(45) Date of Patent: Jun. 25, 2019

(54) PLUGGED HONEYCOMB STRUCTURE

(71) Applicant: NGK INSULATORS, LTD., Nagoya (JP)

(72) Inventors: Yuichi Hamazaki, Nagoya (JP); Takahiro Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 253 days.

(21) Appl. No.: 15/471,343

(22) Filed: Mar. 28, 2017

(65) Prior Publication Data

US 2017/0282109 A1    Oct. 5, 2017

(30) Foreign Application Priority Data

Mar. 30, 2016  (JP) ................................ 2016-069757
Mar. 28, 2017  (JP) ................................ 2017-062752

(51) Int. Cl.
| | | |
|---|---|---|
| B01D 46/24 | (2006.01) | |
| B28B 3/20 | (2006.01) | |
| B28B 11/00 | (2006.01) | |
| B28B 11/08 | (2006.01) | |
| B28B 11/24 | (2006.01) | |
| F01N 3/022 | (2006.01) | |

(52) U.S. Cl.
CPC ....... B01D 46/2474 (2013.01); B01D 46/247 (2013.01); B01D 46/2455 (2013.01); B28B 3/20 (2013.01); B28B 11/007 (2013.01); B28B 11/08 (2013.01); B28B 11/241 (2013.01); B28B 11/243 (2013.01); B01D 2046/2492 (2013.01); B01D 2046/2496 (2013.01); B01D 2275/406 (2013.01); F01N 3/0222 (2013.01); F01N 2330/06 (2013.01); F01N 2330/30 (2013.01); F01N 2330/34 (2013.01)

(58) Field of Classification Search
None
See application file for complete search history.

(56) References Cited

U.S. PATENT DOCUMENTS

| | | | | | |
|---|---|---|---|---|---|
| 4,290,743 | A | * | 9/1981 | Suzuki | .................... B28B 3/269 264/177.12 |
| 6,159,431 | A | * | 12/2000 | Inoue | ...................... B01J 35/04 422/177 |

(Continued)

FOREIGN PATENT DOCUMENTS

| | | |
|---|---|---|
| EP | 3 173 139 A1 | 5/2017 |
| JP | 2003-269131 A1 | 9/2003 |
| JP | 2014-200741 A1 | 10/2014 |

*Primary Examiner* — Amber R Orlando
(74) *Attorney, Agent, or Firm* — Burr & Brown, PLLC (57) ABSTRACT

A plugged honeycomb structure in which in a cross section of a honeycomb structure body which is perpendicular to an extending direction of cells, inflow cells are disposed to surround an outflow cell, and the number of the inflow cells is larger than the number of the outflow cells, and the cross section has a plurality of intersecting portions of partition walls each defining the inflow cells which are adjacent to each other, and in 60% or more of a total number of the intersecting portions, a relation between a diameter ($D_1$) of a circle inscribed in the intersecting portion and a diameter ($D_0$) of a circle inscribed in the partition wall defining the inflow cell and the outflow cell which are adjacent to each other satisfies $D_1/(\sqrt{2} \times D_0) = 1.20$ to $1.80$

4 Claims, 6 Drawing Sheets

(56) References Cited

U.S. PATENT DOCUMENTS

| | | | |
|---|---|---|---|
| 6,890,616 B2 | 5/2005 | Suwabe et al. | |
| 7,393,377 B2 * | 7/2008 | Kasai | B01D 39/2068 |
| | | | 428/116 |
| 7,504,146 B2 * | 3/2009 | Ando | C04B 38/0009 |
| | | | 428/116 |
| 7,982,158 B2 * | 7/2011 | Koishikura | B23H 9/00 |
| | | | 219/69.17 |
| 7,989,047 B2 * | 8/2011 | Segawa | B32B 15/06 |
| | | | 428/116 |
| 9,080,484 B2 | 7/2015 | Miyairi | |
| D763,427 S | 8/2016 | Miyairi | |
| 2003/0165662 A1 | 9/2003 | Suwabe et al. | |
| 2014/0298779 A1 | 10/2014 | Miyairi | |
| 2017/0128874 A1 * | 5/2017 | Hamazaki | B01D 46/2459 |

* cited by examiner

PLUGGED HONEYCOMB STRUCTURE

The present application is an application based on JP-2016-69757 filed on Mar. 30, 2016 and JP-2017-62752 filed on Mar. 28, 2017 with Japan Patent Office, the entire contents of which are incorporated herein by reference.

BACKGROUND OF THE INVENTION

Field of the Invention

The present invention relates to a plugged honeycomb structure for a wall flow type exhaust gas filter, and more particularly, the present invention relates to a plugged honeycomb structure suitably for use in removal of particulate matter included in an exhaust gas from an engine such as a car engine and/or in purification of a harmful gas of nitrogen oxides and the like.

Description of the Related Art

Internal combustion engines are used as power sources in various industries. On the other hand, an exhaust gas emitted from the internal combustion engine at a time of combustion of fuel includes particulate matter (hereinafter also referred to as "PM") such as soot or ash together with a harmful gas of nitrogen oxides and the like, and the exhaust gas is discharged to the air atmosphere. In particular, regulations on removal of the PM emitted from a diesel engine have become severe worldwide, and a wall flow type gas purifying filter having a honeycomb structure is used as a diesel particulate filter which removes the PM (hereinafter also referred to as "DPF").

In the above DPF, a plurality of cells which becomes a through channel for a fluid is defined by porous partition walls, the cells are alternately plugged, and in this structure, the above porous partition walls perform a function of the filter which removes the PM.

Specifically, a honeycomb structure has heretofore been used in which an exhaust gas containing PM flows inside from an inflow-side end face of the above DPF, the PM is trapped with the porous partition walls to filter the exhaust gas, and then the purified exhaust gas is emitted from an outflow-side end face. However, the PM is deposited on the partition walls to close inflow cells of the exhaust gas as the exhaust gas flows inside. Consequently, when the cells are closed, a pressure loss of the DPF rapidly increases.

Thus, for the purpose of inhibiting the cells from being closed, it is important to increase a filter area and an open frontal area of the inflow cells. However, in a case where the inflow cells and outflow cells have different sectional areas and sectional shapes each other, a thickness of the partition walls forming the cells might decrease in a part of a portion in which the partition walls intersect each other, thereby to lower strength. Consequently, when the PM deposited in the DPF is burnt and removed to regenerate the DPF, a thermal stress is concentrated on a part of the thinned intersecting portion of the partition walls to generate cracks.

To solve such a problem, a wall flow type DPF has been suggested in which an opening diameter of each outflow cell is kept to be large while increasing the filter area and open frontal area of the inflow cells, thereby making it possible to keep a pressure loss low at an initial time and at a time of PM deposition, and in which a thermal shock resistance is high (Patent Document 1).

Furthermore, in Patent Document 1, there is described a technology of disposing substantially circular R-parts in all thinned partition wall intersecting portions to prevent the generation of the cracks. Additionally, there has been suggested a technology of disposing substantially circular R-parts in corner portions of cells which face each other to prevent generation of cracks in intersecting portions of partition walls (Patent Document 2).

[Patent Document 1] JP-A-2014-200741
[Patent Document 2] JP-A-2003-269131

SUMMARY OF THE INVENTION

Figure 5:
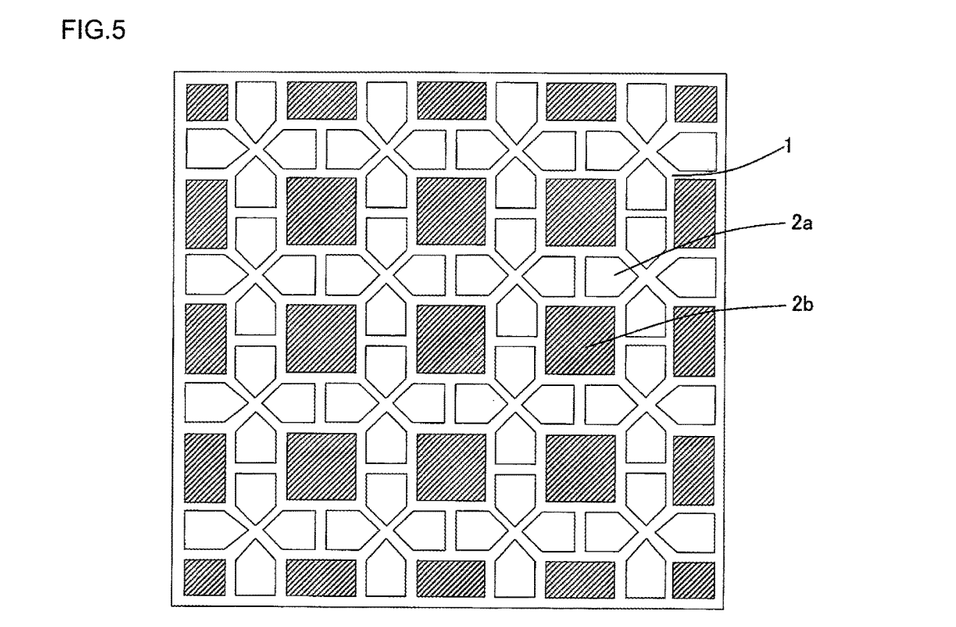
FIG. 5 is a plan view schematically showing an inflow-side end face of a conventional segment type plugged honeycomb structure.

However, as in a conventional DPF shown in, for example, FIG. 5, a partition wall intersecting portion in which vertexes of four inflow cells gather has a structure on which stress is easily concentrated. Therefore, in a case where the DPF is used as a wall flow type gas purifying filter in an exhaust system of a car engine, thermal stress due to rapid heating and rapid cooling in PM burning such as soot burning might be generated in addition to vibration, during running of a car. Then, in a case where this thermal stress is generated, the possibility of cracks generated in the DPF further increases.

Figure 6:
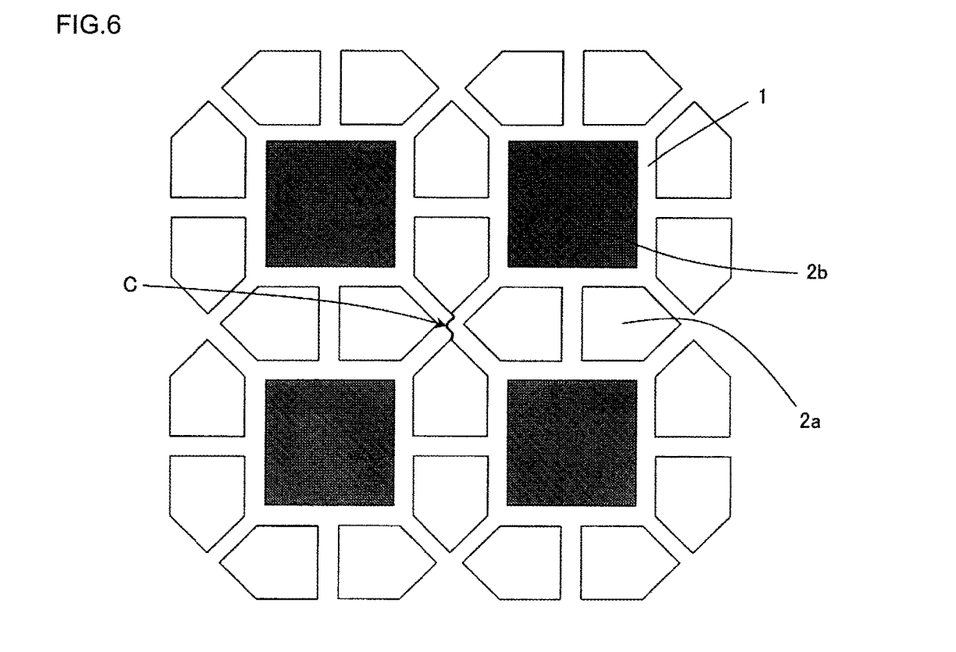
FIG. 6 is a view schematically showing a typical crack in an enlarged view of the conventional plugged honeycomb structure of FIG. 5.

FIG. 6 shows a schematic view of a typical crack of a conventional DPF. It is considered that the crack connecting vertexes of inflow cells to one another usually has only small contribution to soot leakage. However, in a case where the cracks develop to reach the outflow cells, there is the possibility that the soot leakage is generated, and hence it is necessary to prevent this possibility. FIG. 5 is a plan view schematically showing an inflow-side end face of a conventional segment type plugged honeycomb structure. FIG. 6 is a view schematically showing the typical crack in an enlarged view of the conventional plugged honeycomb structure of FIG. 5.

As means for preventing the above generation of the cracks, a reinforcement of the cells has heretofore been performed as disclosed in Patent Document 2. However, in a case where reinforcing portions are disposed in all intersecting portions of the partition walls as in a conventional technology, it is possible to solve the problem of the generation of the cracks, but an open area of each cell decreases, thereby causing the problem that a pressure loss increases or an ash capacity for ash decreases. Furthermore, in the conventional DPF, a heat capacity increases, and hence the demerit that a light-off performance deteriorates is present. It is to be noted that the light-off performance means temperature characteristics to exhibit a purifying performance of a catalyst loaded onto the DPF.

The present invention has been developed in view of these problems of the conventional technology. According to the present invention, there is provided a plugged honeycomb structure which is capable of improving a mechanical strength and a thermal shock resistance while maximally inhibiting a decrease of an opening area, an increase of a pressure loss and a decrease of an ash capacity.

According to the present invention, a plugged honeycomb structure is provided as follows.

[1] A plugged honeycomb structure including a honeycomb structure body having porous partition walls defining a plurality of cells which extends from an inflow-side end face to an outflow-side end face and becomes a through channel for a fluid, inflow-side plugging portions disposed in open ends of predetermined inflow cells in the outflow-side end face, and outflow-side plugging portions disposed in open ends of residual outflow cells in the inflow-side end face, wherein in a cross section of the honeycomb structure body which is perpendicular to an extending direction of the cells, the inflow cells are disposed to surround the outflow cell, and the number of the inflow cells is larger than the number of the outflow cells, the cross section has a plurality of intersecting portions of the partition walls each defining the inflow cells which are adjacent to each other, and in 60% or more of a total number of the intersecting portions, a relation between a diameter $D_1$ of a circle inscribed in the intersecting portion and a diameter $D_0$ of a circle inscribed in the partition wall defining the inflow cell and the outflow cell which are adjacent to each other satisfies Equation (1) mentioned below:

$$D_1/(\sqrt{2} \times D_0) = 1.20 \text{ to } 1.80. \quad \text{Equation (1):}$$

[2] The plugged honeycomb structure according to the above [1], wherein in the total number of the intersecting portions, the relation between the diameter $D_1$ of the circle inscribed in the intersecting portion and the diameter $D_0$ of the circle inscribed in the partition wall defining the inflow cell and the outflow cell which are adjacent to each other satisfies Equation (1).

[3] The plugged honeycomb structure according to the above [1] or [2], wherein a diameter $D_2$ of a circle which is inscribed in the inflow cell and comes in contact with the partition wall on the side of the intersecting portion of the inflow cell is from 0.20 to 0.80 mm.

[4] The plugged honeycomb structure according to any one of the above [1] to [3], wherein only in the intersecting portion of the partition walls each defining the inflow cells which are adjacent to each other, the relation between the diameter $D_1$ of the circle inscribed in the intersecting portion and the diameter $D_0$ of the circle inscribed in the partition wall defining the inflow cell and the outflow cell which are adjacent to each other satisfies Equation (1).

In a plugged honeycomb structure of the present invention, reinforcing portions are selectively disposed only in corner portions of a partition wall intersecting portion in which vertexes of a plurality of inflow cells gather. Consequently, this arrangement of reinforcing portions enables a mechanical strength and a thermal shock resistance of a DPF to be improved and a decrease of an opening area, an increase of a pressure loss, a decrease of an ash capacity and a deterioration of a light-off performance to be maximally inhibited.

DESCRIPTION OF THE PREFERRED EMBODIMENTS

Hereinafter, embodiments of the present invention will be described. However, the present invention is not limited to the following embodiments. Therefore, it should be understood that changes, improvements and the like are suitably addable to the following embodiments on the basis of usual knowledge of a person skilled in the art without departing from the gist of the present invention.

Figure 1:
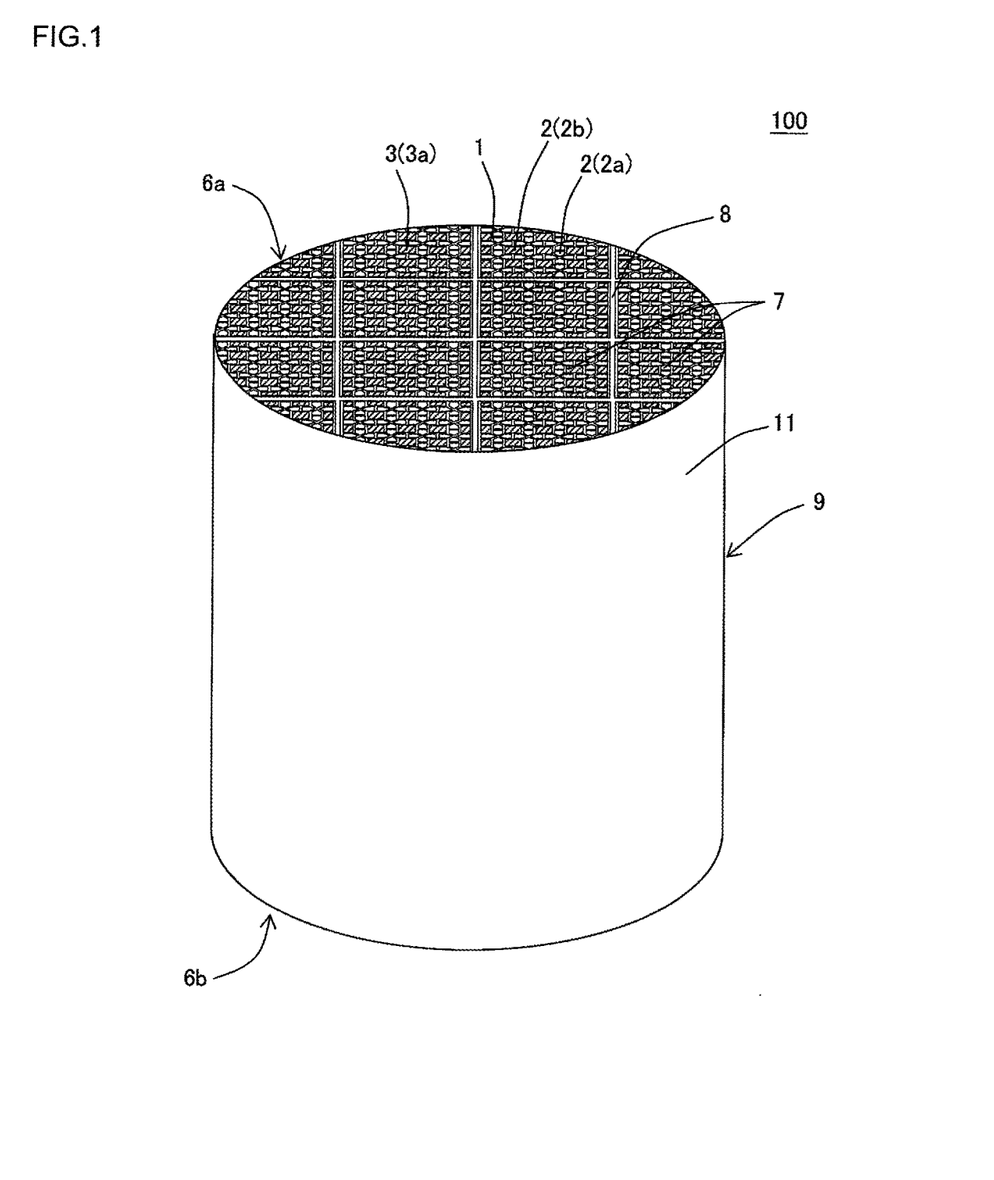
FIG. 1 is a perspective view of a plugged honeycomb structure according to an embodiment of the present invention.
Figure 2:
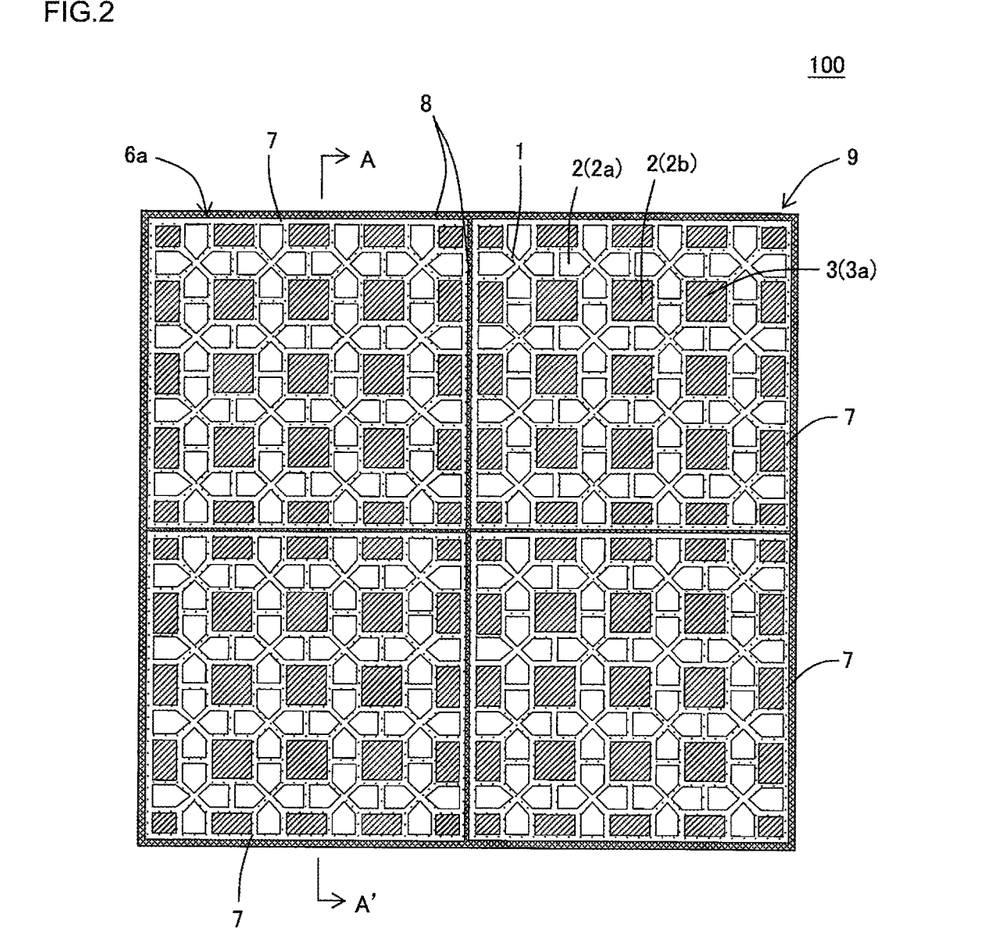
FIG. 2 is a plan view schematically showing a part of an inflow-side end face of the plugged honeycomb structure shown in FIG. 1.
Figure 3:
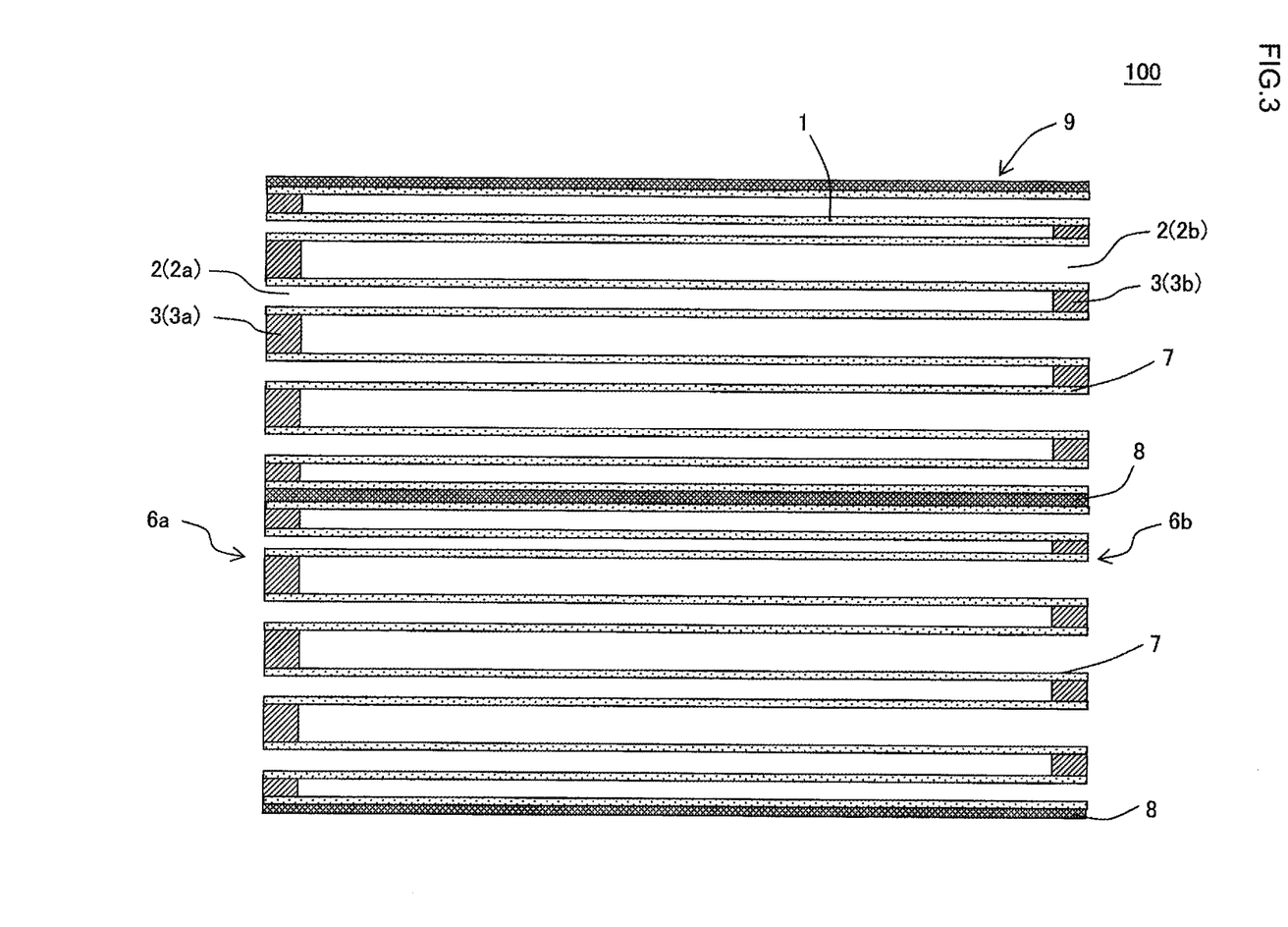
FIG. 3 is a cross-sectional view along the A-A' line of FIG. 2.
Figure 4:
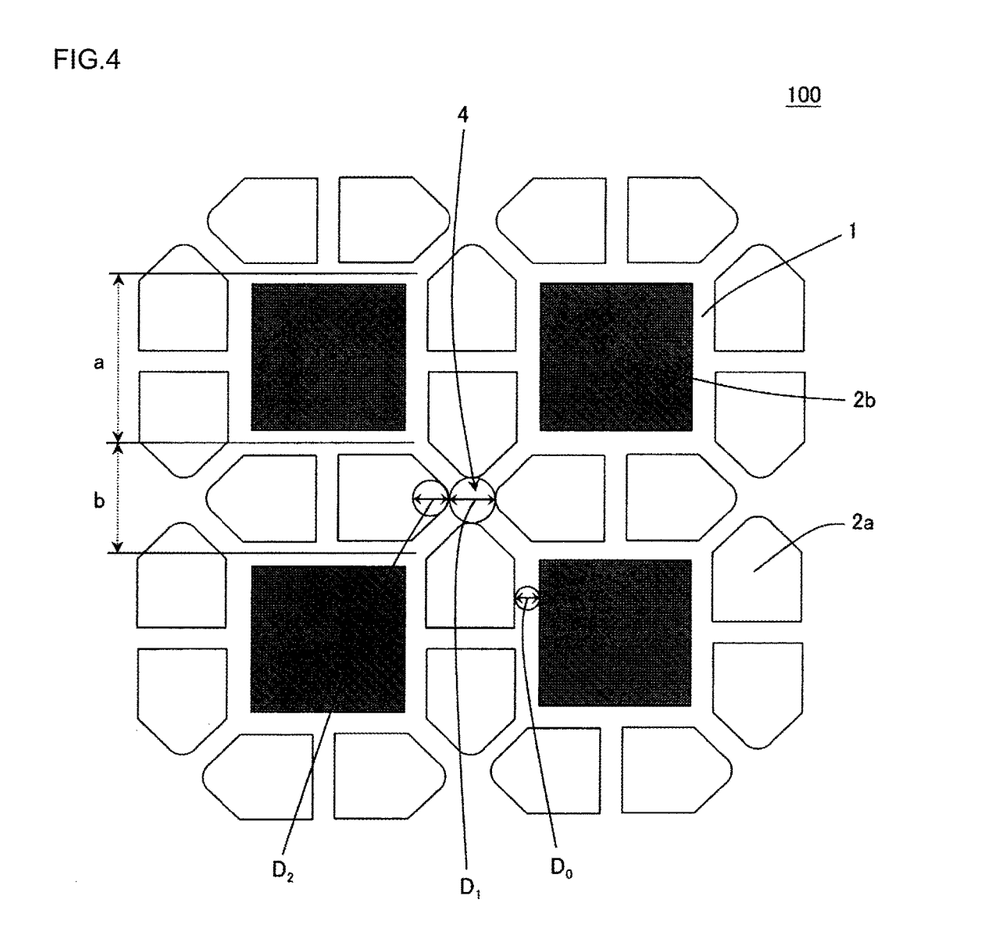
FIG. 4 is a plan view schematically showing an enlarged inflow-side end face of FIG. 2.

FIG. 1 to FIG. 4 are views schematically showing a plugged honeycomb structure according to an embodiment of the present invention. Here, a plugged honeycomb structure 100 of the present embodiment may be directed to a segment type honeycomb structure in which a plurality of honeycomb segments is bonded to one another or a monolithic honeycomb structure in which partition walls and a circumferential wall are integrally formed. FIG. 1 is a perspective view of the plugged honeycomb structure according to an embodiment of the present invention. FIG. 2 is a plan view schematically showing a part of an inflow-side end face of the plugged honeycomb structure shown in FIG. 1. FIG. 3 is a cross-sectional view along the A-A' line of FIG. 2. FIG. 4 is a plan view schematically showing an enlarged inflow-side end face 6a of FIG. 2.

The plugged honeycomb structure 100 of the present embodiment includes a honeycomb structure body 9, inflow-side plugging portions 3a, and outflow-side plugging portions 3b. The honeycomb structure body 9 includes a plurality of honeycomb segments 7. Each of the plurality of honeycomb segments 7 has porous partition walls 1 defining a plurality of cells 2a and 2b which extends from the inflow-side end face 6a to an outflow-side end face 6b. These cells become through channels for a fluid. A bonding layer 8 is disposed between side surfaces of the plurality of honeycomb segments 7, and the plurality of honeycomb segments 7 are bonded by the bonding layer 8, thereby forming the honeycomb structure body 9. In a circumference of the honeycomb structure body 9, a circumferential wall 11 is disposed to surround a bonded body in which the plurality of honeycomb segments 7 is bonded.

The inflow-side plugging portions 3a are disposed in open ends of the predetermined inflow cells 2a in the outflow-side end face 6b. The outflow-side plugging portions 3b are disposed in open ends of the residual outflow cells 2b in the inflow-side end face 6a.

In the plugged honeycomb structure 100, the inflow cells 2a are disposed to surround the outflow cell 2b in a cross section of the honeycomb structure body 9 which is perpendicular to an extending direction of cells 2 of the honeycomb structure body 9. Furthermore, the plugged honeycomb structure 100 is configured so that the number of the inflow cells 2a is larger than the number of the outflow cells 2b. The plugged honeycomb structure 100 has a plurality of intersecting portions 4 of the partition walls 1 each defining the inflow cells 2a which are adjacent to each other. The plugged honeycomb structure 100 further is configured to have the following structure in 60% or more of a total number of the intersecting portions 4 of the partition walls 1 each defining the inflow cells 2a which are adjacent to each other. First, a relation between a diameter $D_1$ of a circle inscribed in the above-mentioned intersecting portion 4 and a diameter $D_0$ of a circle inscribed in the partition wall 1 defining the inflow cell 2a and the outflow cell 2b which are adjacent to each other satisfies Equation (1) mentioned below. Hereinafter, "the intersecting portions 4 of the partition walls 1 each defining the inflow cells 2a which are adjacent to each other" is referred to as "the intersecting portion 4 in which only the partition walls 1 each defining the plurality of inflow cells 2a which are adjacent to each other intersect". That is, "the intersecting portions 4 of the partition walls 1 each defining the inflow cells 2a which are adjacent to each other" is referred to as "the portion being the partition walls 1 extending from the intersecting point as a base point each only defining the inflow cells 2a which are adjacent to each other. Hereinafter, in a case of simply referring to "the intersecting portion 4", above-mentioned "the intersecting portion 4 of the partition walls 1 each defining the inflow cells 2a which are adjacent to each other" is meant unless otherwise specified.

$$D_1/(\sqrt{2} \times D_0) = 1.20 \text{ to } 1.80 \qquad \text{Equation (1):}$$

Here, the present embodiment will be described with reference to FIG. 4. When it is described that the inflow cells 2a are disposed to surround the outflow cell 2b, there is meant, for example, a state where a plurality of inflow cells 2a is disposed to surround one outflow cell 2b. It is to be noted that concerning the cells 2 arranged in an outermost circumference of the inflow-side end face 6a of the plugged honeycomb structure 100, the inflow cells 2a might not be disposed to surround the outflow cell 2b. Furthermore, also in each honeycomb segment 7, concerning the cells 2 arranged in the outermost circumference, the inflow cells 2a might not be disposed to surround the outflow cell 2b. Here, in FIG. 4, the outflow cell 2b in which a cell shape is quadrangular shape is surrounded with pentangular inflow cells 2a in which a cell shape is smaller than that of the outflow cell 2b. It is to be noted that there is not any special restriction on the cell shape of the outflow cells 2b and the cell shape of the inflow cells 2a, as long as the inflow cell 2a can be disposed to surround the outflow cells 2b. It is considered that examples of the cell shape include polygonal shapes such as a quadrangular shape, a pentangular shape and a hexagonal shape, but the present invention is not limited to the examples. Furthermore, sizes of one outflow cell 2b and one inflow cell 2a (i.e., a sectional area of each cell) may be the same or different. Here, "the cell shape" is referred to as the shape of each cell in the cross section of the honeycomb structure body which is perpendicular to the cell extending direction.

Furthermore, the intersecting portion 4 of the partition walls 1 each defining the inflow cells 2a which are adjacent to each other means the intersecting portion 4 in which only the partition walls 1 each defining the plurality of inflow cells 2a disposed to surround the outflow cell 2b intersect. It is to be noted that as shown in FIG. 1 and FIG. 2, a shape of the inflow cell 2a might be partially crushed in the vicinity of the circumferential wall of the plugged honeycomb structure 100. The inflow cell 2a whose cell shape is partially crushed is also counted as one inflow cell 2a.

Next, the diameter $D_1$ of the circle inscribed in the intersecting portion 4 is a diameter of a circle inscribed in the intersecting portion 4 of the partition walls 1 as shown in FIG. 4. It is to be noted that "the circle inscribed in the intersecting portion 4" is the inscribed circle which comes in contact with the inflow cells 2a which are more than half of the inflow cells 2a facing the intersecting portion 4, in the intersecting portion 4 of the partition walls 1. Furthermore, "the diameter $D_1$ of the circle inscribed in the intersecting portion 4" is a diameter of the inscribed circle whose diameter is maximum in a case where a plurality of inscribed circles which comes in contact with more than half of the inflow cells 2a are present.

Furthermore, as shown in FIG. 4, the diameter $D_0$ of the circle inscribed in the partition wall 1 defining the inflow cell 2a and the outflow cell 2b which are adjacent to each other is a diameter of a circle inscribed in the partition wall 1 in a portion other than the intersecting portion of the partition walls defining the inflow cell 2a and the outflow cell 2b. In other words, the diameter means a diameter of a circle which comes in external contact with portions of the inflow cell 2a and outflow cell 2b facing each other which exclude corner portions of the cells. Hereinafter, "the diameter $D_0$ of the circle inscribed in the partition wall 1 defining the inflow cell 2a and the outflow cell 2b which are adjacent to each other" will simply be referred to as "the diameter $D_0$ of the circle inscribed in the partition wall 1" sometimes. The diameter $D_0$ of the circle inscribed in the partition wall 1 defining the inflow cell 2a and the outflow cell 2b which are adjacent to each other can be obtained as follows. First, in the inflow-side end face 6a of the plugged honeycomb structure 100, five portions of the partition wall 1 defining the inflow cell 2a and the outflow cell 2b which are adjacent to each other are selected at random. Then, to the partition wall 1 of the five selected portions, inscribed circles are virtually drawn and diameters of the inscribed circles are obtained. An average value of the diameters of the inscribed circles of the five portions is defined as the diameter $D_0$ of the circle.

Figure 7:
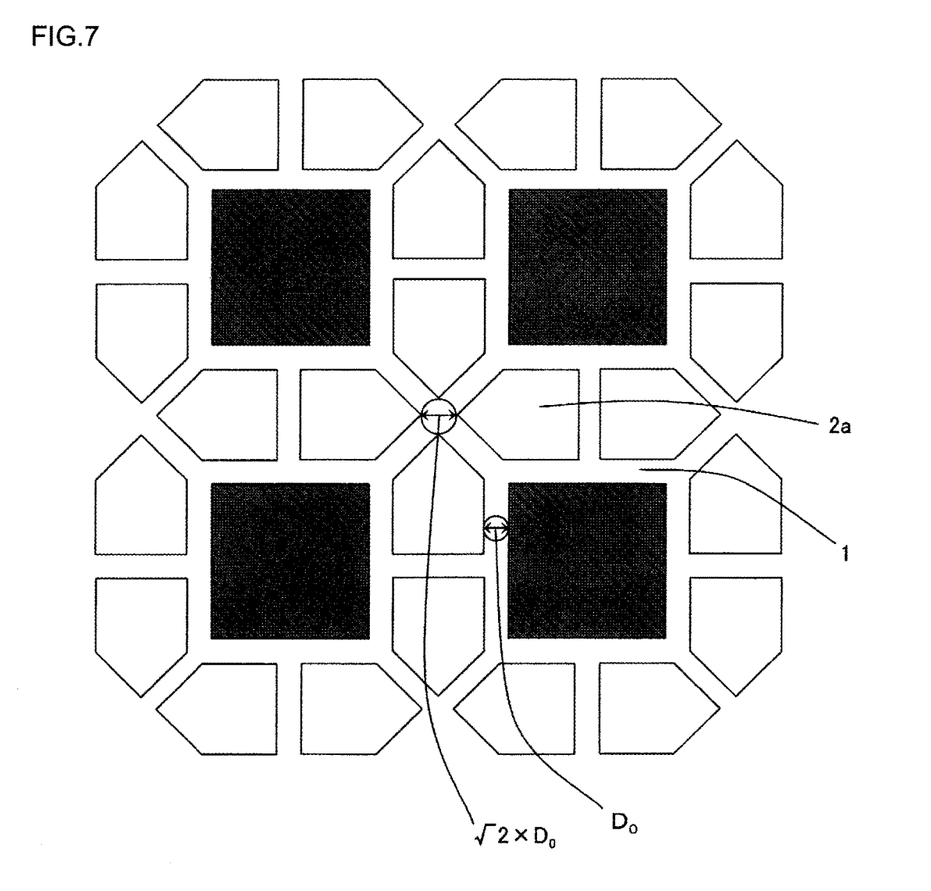
FIG. 7 is an enlarged view of the conventional plugged honeycomb structure of FIG. 5 and an explanatory view of a circle inscribed in an intersecting portion.

Here, $\sqrt{2} \times D_0$ in Equation (1) is described. As shown in FIG. 7, $\sqrt{2} \times D_0$ in Equation (1) indicates a value of a diameter of a circle inscribed in the intersecting portion 4 of the partition wall 1 defining the inflow cells 2a in a conventional plugged honeycomb structure in which any reinforcing portions are not arranged. FIG. 7 is an enlarged view of the conventional plugged honeycomb structure of FIG. 5 and an explanatory view of the circle inscribed in the intersecting portion. The plugged honeycomb structure 100 of the present embodiment has characteristics that the diameter $D_1$ of the circle inscribed in the intersecting portion 4 of the partition walls 1 each defining the inflow cells 2a which are adjacent to each other is larger than "the diameter of the circle inscribed in the intersecting portion of a similar region" of the conventional plugged honeycomb structure in which any reinforcing portions are not disposed.

A ratio of the number of the intersecting portions 4 which satisfy the conditions of Equation (1) mentioned above is at least 60% and more preferably 100% in a case where a ratio of a total number of the intersecting portions 4 is defined as 100%. In a case where the ratio of the number of the intersecting portions 4 satisfying the above conditions is smaller than 60%, a thermal shock resistance remarkably deteriorates.

In a case where a value of "$D_1/(\sqrt{2} \times D_0)$" in Equation (1) mentioned above is smaller than 1.20, a sufficient thermal shock resistance cannot be obtained. On the other hand, in a case where the value of "$D_1/(\sqrt{2} \times D_0)$" in Equation (1) mentioned above is in excess of 1.80, a pressure loss increases, a light-off performance deteriorates, and an ash capacity decreases.

Furthermore, only in the intersecting portion 4 of the partition walls 1 each defining the inflow cells 2a which are adjacent to each other, the relation between the diameter ($D_1$) of the circle inscribed in the intersecting portion 4 and the diameter ($D_0$) of the circle inscribed in the partition wall 1 defining the inflow cell 2a and the outflow cell 2b which are adjacent to each other satisfies Equation (1). This means that, differently from a conventional technology of arranging the reinforcing portions in all the intersecting portions of the partition walls, the reinforcing portion is disposed only in the intersecting portion 4 of the partition walls 1 each defining the inflow cells 2a which are adjacent to each other in the present invention as shown in FIG. 1 to FIG. 4. A method of preparing such a reinforcing portion can include a method of changing a shape of a die for extrusion by a heretofore known method. Alternatively, the above-mentioned reinforcing portion may be prepared by pouring a slurry into a predetermined corner portion of the predetermined inflow cell 2a to form the corner portion having a radius. Furthermore, "the reinforcing portion is disposed" means that the intersecting portion 4 of the partition walls 1 each defining the inflow cells 2a which are adjacent to each other satisfies the above-mentioned relation of Equation (1). Furthermore, "Equation (1) is satisfied only in the intersecting portion 4 of the partition walls 1 each defining the inflow cells 2a which are adjacent to each other" means that the relation of Equation (1) does not have to be satisfied in another intersecting portion. Here, when it is described that the relation of Equation (1) mentioned above is not satisfied, it is meant, for example, that a relation of $D1=\sqrt{2} \times D_0$ may be satisfied as in the conventional technology or a value of "$D_1/(\sqrt{2} \times D_0)$" may be smaller than 1.20. However, it is to be noted that Equation (1) mentioned above does not include any manufacturing tolerances.

Furthermore, it is preferable that a diameter $D_2$ of a circle which is inscribed in the inflow cell 2a and comes in contact with the partition wall 1 on the side of the intersecting portion 4 of the inflow cell 2a is from 0.20 to 0.80 mm. Here, FIG. 4 shows the diameter $D_2$ of the circle which is inscribed in the inflow cell 2a and comes in contact with the partition wall 1 on the side of the intersecting portion 4 of the inflow cell 2a. As shown in FIG. 4, the circle having the diameter $D_2$ is present in the inflow cell 2a and comes in contact with the partition walls 1 of the intersecting portion 4. This diameter of the circle is the above-mentioned "diameter $D_2$". Here, in a case where the diameter $D_2$ is smaller than 0.20 mm, it might not be possible to obtain the sufficient thermal shock resistance.

In the plugged honeycomb structure 100 of the present embodiment, one suitable example of the honeycomb structure body 9 includes the following honeycomb structure body. In the inflow cells 2a, a geometric surface area GSA is preferably from 10 to 30 $cm^2/cm^3$ and further preferably from 12 to 18 $cm^2/cm^3$. Here, the above-mentioned "geometric surface area GSA" is referred to as a value (S/V) which is calculated as all inner surface areas (S) of the inflow cells 2a divided by a total volume (V) of the honeycomb structure body 9. Usually, the larger a filter area of a filter is, the more a thickness of PM to be deposited on the partition walls can decrease. Therefore, when the geometric surface area GSA is adjusted into the above-mentioned numeric range, it is possible to keep the pressure loss of the plugged honeycomb structure low. In consequence, when the geometric surface area GSA of the inflow cells 2a is smaller than 10 $cm^2/cm^3$, a pressure loss at a time of PM deposition unfavorably increase. Alternatively, when the area is larger than 30 $cm^2/cm^3$, an initial pressure loss unfavorably increases.

In the plugged honeycomb structure 100 of the present embodiment, a ratio of a cell cross section open frontal area of the inflow cells 2a is preferably from 20 to 70% and further preferably from 25 to 65%. When the ratio of the cell cross section open frontal area of the inflow cells 2a is smaller than 20%, an initial pressure loss unfavorably increases. Alternatively, when the ratio is larger than 70%, a filtering flow velocity becomes fast, a PM trapping efficiency therefore deteriorates, and furthermore, strength of the partition walls 1 unfavorably is insufficient. Here, "the ratio of the cell cross section open frontal area of the inflow cells 2a" means such a ratio as described below in a cross section which is vertical to a central axis direction of the honeycomb structure body 9. That is, its ratio means a ratio of "a sum of cross sections of the inflow cells 2a" to a total of "a total sectional area of the partition walls 1 forming the honeycomb structure body 9" and "a sum of sectional areas of all the cells 2 (all of the inflow cells 2a and the outflow cells 2b)".

In the plugged honeycomb structure 100 of the present embodiment, a hydraulic diameter of each of a plurality of cells 2 (the inflow cells 2a and the outflow cells 2b) is preferably from 0.5 to 2.5 mm and further preferably from 0.8 to 2.2 mm. When the hydraulic diameter of each cell is smaller than 0.5 mm, an initial pressure loss unfavorably increases. Alternatively, when the hydraulic diameter is larger than 2.5 mm, a contact area of an exhaust gas with the partition walls 1 decreases, and a purification efficiency unfavorably deteriorates. Here, the hydraulic diameter of each cell is a value calculated by 4×(a sectional area)/(a peripheral length) on the basis of the sectional area and peripheral length of each cell 2. The sectional area of the cell 2 indicates an area of the cell shape (i.e., a sectional shape) appearing in the cross section which is vertical to the central axis direction of the honeycomb structure body 9. The peripheral length of the cell indicates a length of a periphery of the sectional shape of the cell (i.e., a length of a closed line surrounding the cross section).

In view of trade-off between the initial pressure loss or the pressure loss at the time of PM deposition and the trapping efficiency, the plugged honeycomb structure 100 of the present embodiment may include the following structure. It is preferable to simultaneously satisfy the conditions that the geometric surface area GSA of the inflow cells 2a is from 10 to 30 $cm^2/cm^3$, the ratio of the cell cross section open frontal area of the inflow cells 2a is from 20 to 70% and the hydraulic diameter of each of the plurality of cells 2 is from 0.5 to 2.5 mm. It is further preferable to simultaneously satisfy the conditions that the geometric surface area GSA of the inflow cells 2a is from 12 to 18 $cm^2/cm^3$, the ratio of the cell cross section open frontal area of the inflow cells 2a is from 25 to 65% and the hydraulic diameter of each of the plurality of cells 2 is from 0.8 to 2.2 mm.

In the plugged honeycomb structure 100 of the present embodiment, a catalyst may be loaded onto the partition walls 1. The loading of the catalyst onto the partition walls 1 indicates that the surfaces of the partition walls 1 and inner walls of pores formed in the partition walls 1 are coated with the catalyst. Examples of a type of catalyst include an SCR catalyst (zeolite, titania, and vanadium) and a three-way catalyst including at least two selected from the group consisting of Pt, Ph and Pd and at least one selected from the group consisting of alumina, ceria and zirconia. When such a catalyst is loaded, it is possible to detoxify $NO_x$, CO, CH and the like included in the exhaust gas emitted from a direct injection type gasoline engine, a diesel engine or the like, and it is also possible to easily burn and remove the PM deposited on the surfaces of the partition walls 1 by a catalytic operation.

There is not any special restriction on a method of loading the catalyst onto the plugged honeycomb structure 100 of the present embodiment, and a method to be usually performed by a person skilled in the art can be employed.

Specifically, an example of the method is a method of performing wash-coating with a catalyst slurry, drying and firing.

There is not any special restriction on a manufacturing method of the plugged honeycomb structure 100 of the present embodiment. The plugged honeycomb structure can be manufactured by such a method as described below. To a material selected from the above-mentioned suitable materials as raw material powder of the honeycomb structure body 9, a binder is added, and a surfactant and water are further added to prepare a kneaded material having a plasticity. For example, silicon carbide powder can be used as the raw material powder. Examples of the binder include methylcellulose and hydroxypropoxylmethylcellulose. This kneaded material is extruded to obtain a formed body of the honeycomb structure body 9 including the partition walls 1 and the cells 2 having predetermined sectional shapes. This body is dried with, for example, microwaves and hot air. Afterward, plugging is performed with a material similar to that used in manufacturing the honeycomb structure body 9 to dispose plugging portions 3 (the inflow-side plugging portions 3a and the outflow-side plugging portions 3b), further followed by drying. Afterward, heating and degreasing are performed in, for example, a nitrogen atmosphere, and then firing is performed in an inactive atmosphere of argon or the like, so that the plugged honeycomb structure 100 of the present embodiment can be obtained. A firing temperature and firing atmosphere vary with a raw material, and a person skilled in the art can select the firing temperature and firing atmosphere which are most suitable for the selected material.

In the present embodiment, there is not any special restriction on materials of partition walls and a circumferential wall of which is included the honeycomb structure body 9, but from viewpoints of a strength, a heat resistance, a durability and others, it is preferable that a main component is any type of ceramics of an oxide or a non-oxide, a metal or the like. Examples of ceramics include cordierite, mullite, alumina, spinel, silicon carbide, silicon nitride, and aluminum titanate. Examples of the metal include a Fe—Cr—Al based metal and a metal silicide. It is preferable to use at least one selected from these materials as the main component. From the viewpoints of a high strength and a high heat resistance, it is especially preferable to use, as the main component, at least one selected from the group consisting of alumina, mullite, aluminum titanate, cordierite, silicon carbide and silicon nitride. Here, when it is described that the material "is used as the main component", it is meant that the material in the honeycomb structure body 9 contains at least 50 mass %, preferably 70 mass % or more and further preferably 80 mass % or more.

There is not any special restriction on a material of the plugging portions 3 (the inflow-side plugging portions 3a and the outflow-side plugging portions 3b). It is preferable that the material is the same as in the honeycomb structure body 9.

A thickness of the partition walls 1 is preferably from 100 to 410 μm and further preferably from 150 to 360 μm. When the thickness is smaller than 100 μm, a strength of a honeycomb substrate might deteriorate. When the thickness is larger than 410 μm, a trapping performance might deteriorate and the pressure loss might increase. Furthermore, in a case of treating the exhaust gas emitted from the diesel engine, an amount of the PM in the exhaust gas emitted from the diesel engine is comparatively large, and hence there is usually a tendency to decrease the number of the cells (decrease a cell density). Therefore, it is preferable that the thickness of the partition walls 1 is from 150 to 360 μm for the purpose of improving balance between the strength and the trapping performance. The thickness of the partition walls is a value measured by a method of observing a cross section of the honeycomb substrate in an axial direction with a microscope.

EXAMPLES

Example 1

80 parts by mass of silicon carbide powder and 20 parts by mass of Si powder were mixed to obtain mixed powder. To this mixed powder, a binder, a pore former and water were added to obtain a forming raw material. Next, the forming raw material was kneaded to prepare a round pillar-shaped kneaded material.

Next, the kneaded material was extruded by use of a predetermined extrusion die, and a honeycomb formed body was obtained in which each square outflow cell was surrounded with pentangular inflow cells. 16 honeycomb formed bodies were prepared.

Next, each honeycomb structure body was dried with a microwave dryer and further completely dried with a hot air drier, and then both end faces of the honeycomb formed body were cut to adjust a dimension of the honeycomb formed body into a predetermined dimension. Next, a film was attached to cover the whole region of an inflow-side end face of the honeycomb formed body, and perforated portions were made at positions of the film which corresponded to open ends of cells which became the outflow cells. Next, an end portion of the honeycomb formed body on a side to which the film was attached was immersed into a slurried plugging material containing a ceramic raw material, thereby charging the plugging material into the outflow cells in the inflow-side end face. Furthermore, the plugging material was similarly charged into the inflow cells of an outflow-side end face.

Next, a honeycomb dried body was degreased by heating at 400° C. for 5 hours, and then firing was performed by heating at 1450° C. in an argon atmosphere for 2 hours, to obtain a honeycomb fired body. A whole shape of the honeycomb fired body was a quadrangular pillar shape.

Next, the obtained 16 honeycomb fired bodies were arranged adjacent to each other so that side surfaces faced each other, and were bonded by a bonding material to prepare a honeycomb bonded body. The honeycomb bonded body was prepared by bonding the 16 honeycomb fired bodies in total in which 4 bodies were arranged in a longitudinal direction and 4 bodies were arranged in a lateral direction in an end face of the honeycomb bonded body.

Next, a circumferential portion of the honeycomb bonded body was processed by grinding to adjust a shape of a cross section which was vertical to a cell extending direction of the honeycomb bonded body into a round shape. Afterward, an outermost circumference of the ground and processed honeycomb bonded body was coated with a circumference coating material containing a ceramic raw material.

In this way, a plugged honeycomb structure of Example 1 was prepared. The obtained plugged honeycomb structure had a round pillar shape in which a diameter of a cross section perpendicular to a central axis was 143.8 mm and a length in a central axis direction was 152.4 mm. A thickness of partition walls was 0.3 mm and a cell density was 208 cells/cm$^2$.

Table 1 shows the partition wall thickness (mm), a (mm), b (mm) and the cell density (cells/cm$^2$). Here, a (mm) is a length of a range denoted with a symbol a in FIG. 4. That is, a (mm) means a distance between two partition walls 1 which define inflow cells 2a and an outflow cell 2b and face each other via one outflow cell 2b and are disposed in parallel with each other. Furthermore, b (mm) is a length of a range denoted with a symbol b in FIG. 4. That is, b (mm) is a distance between two partition walls 1 which define the inflow cell 2a and the outflow cells 2b and face each other via one inflow cell 2a and are disposed in parallel with each other. In each of a (mm) and b (mm), the distance between the two partition walls 1 is a distance between middle positions of the respective partition walls 1 in a thickness direction.

Furthermore, Table 1 shows "a diameter $D_0$ (mm) of a circle inscribed in the partition wall defining the inflow cell and the outflow cell", "a diameter $D_1$ (mm) of a circle inscribed in an intersecting portion of the partition walls each defining the inflow cells", and "a value of $D_1/(\sqrt{2} \times D_0)$". Furthermore, Table 1 shows "a ratio of the intersecting portions satisfying Equation (1)". Here, "the ratio of the intersecting portions satisfying Equation (1)" is a ratio of the number of the intersecting portions which satisfy a relation of "$D_1/(\sqrt{2} \times D_0)$=1.20 to 1.80" in the intersecting portions of the partition walls each defining the inflow cells which are adjacent to each other.

Furthermore, Table 1 shows "a diameter $D_2$ (mm) of a circle which is inscribed in the inflow cell and comes in contact with the partition wall on the side of the intersecting portion".

Hereinafter, in the present example, "the diameter $D_0$ (mm) of the circle inscribed in the partition wall defining the inflow cell and the outflow cell" will be referred to as "the diameter $D_0$ (mm) of the inscribed circle" sometimes. Furthermore, "the diameter $D_1$ (mm) of the circle inscribed in the intersecting portion of the partition walls each defining the inflow cells" will be referred to as "the diameter $D_1$ of the inscribed circle" sometimes. Furthermore, "the diameter $D_2$ (mm) of the circle which is inscribed in the inflow cell and comes in contact with the partition wall on the side of the intersecting portion" will be referred to as "the diameter $D_2$ (mm) of the inscribed circle" sometimes.

TABLE 1

|  | Comparative Example 1 | Example 1 | Example 2 | Example 3 | Example 4 | Comparative Example 2 |
|---|---|---|---|---|---|---|
| Partition wall thickness [mm] | 0.3 | 0.3 | 0.3 | 0.3 | 0.3 | 0.3 |
| a [mm] | 2.1 | 2.1 | 2.1 | 2.1 | 2.1 | 2.1 |
| b [mm] | 1.84 | 1.84 | 1.84 | 1.84 | 1.84 | 1.84 |
| Cell density [cells/cm$^2$] | 208 | 208 | 208 | 208 | 208 | 208 |
| Diameter $D_0$ [mm] of circle inscribed in partition wall defining inflow cell and outflow cell | 0.30 | 0.30 | 0.30 | 0.30 | 0.30 | 0.30 |
| Diameter D1 [mm] of circle inscribed in intersecting portion of partition walls defining inflow cells | 0.42 | 0.51 | 0.59 | 0.67 | 0.76 | 0.84 |
| Value of $D_1/(\sqrt{2} \times D_0)$ | 1.00 | 1.20 | 1.39 | 1.59 | 1.78 | 1.98 |
| Diameter $D_2$ [mm] of circle which is inscribed in inflow cell and comes in contact with partition wall on intersecting portion side | 0 | 0.20 | 0.40 | 0.60 | 0.80 | 1.00 |
| Ratio of intersecting portions which satisfy Equation (1) [Equation (1):) D1/($\sqrt{2} \times D_0$) = 1.20~1.80] | 1 | 1 | 1 | 1 | 1 | 1 |
| Thermal shock resistance | NG | Pass | Good | Good | Good | Good |
| Light-off performance (Time [seconds] to reach 200° C.) | (Base) | Good | Good | Good | Pass | NG |
| Inlet open frontal area | (Base) | Good | Good | Good | Pass | NG |
| Pressure loss at time of PM deposition | (Base) | Good | Good | Good | Pass | NG |

TABLE 2

|  | Example 5 | Example 6 | Example 7 | Example 8 | Comparative Example 3 | Example 9 | Example 10 | Example 11 | Example 12 | Comparative Example 4 |
|---|---|---|---|---|---|---|---|---|---|---|
| Partition wall thickness [mm] | 0.3 | 0.3 | 0.3 | 0.3 | 0.3 | 0.3 | 0.3 | 0.3 | 0.3 | 0.3 |
| a [mm] | 2.1 | 2.1 | 2.1 | 2.1 | 2.1 | 2.1 | 2.1 | 2.1 | 2.1 | 2.1 |
| b [mm] | 1.84 | 1.84 | 1.84 | 1.84 | 1.84 | 1.84 | 1.84 | 1.84 | 1.84 | 1.84 |
| Cell density [cells/cm$^2$] | 208 | 208 | 208 | 208 | 208 | 208 | 208 | 208 | 208 | 208 |
| Diameter $D_0$ [mm] of circle inscribed in partition wall defining inflow cell and outflow cell | 0.30 | 0.30 | 0.30 | 0.30 | 0.30 | 0.30 | 0.30 | 0.30 | 0.30 | 0.30 |
| Diameter D1 [mm] of circle inscribed in intersecting portion of partition walls defining inflow cells | 0.51 | 0.59 | 0.67 | 0.76 | 0.84 | 0.51 | 0.59 | 0.67 | 0.76 | 0.76 |
| Value of $D_1/(\sqrt{2} \times D_0)$ | 1.20 | 1.39 | 1.59 | 1.78 | 1.98 | 1.20 | 1.39 | 1.59 | 1.78 | 1.78 |
| Diameter $D_2$ [mm] of circle which is inscribed in inflow cell and comes in contact with partition wall on intersecting portion side | 0.20 | 0.40 | 0.60 | 0.80 | 1.00 | 0.20 | 0.40 | 0.60 | 0.80 | 0.80 |

TABLE 2-continued

| | Example 5 | Example 6 | Example 7 | Example 8 | Comparative Example 3 | Example 9 | Example 10 | Example 11 | Example 12 | Comparative Example 4 |
|---|---|---|---|---|---|---|---|---|---|---|
| Ratio of intersecting portions which satisfy Equation (1) [Equation (1:) $D_1/(\sqrt{2} \times D_0) = 1.20\sim1.80$] | 0.8 | 0.8 | 0.8 | 0.8 | 0.8 | 0.6 | 0.6 | 0.6 | 0.6 | 0.4 |
| Thermal shock resistance | Pass | Good | Good | Good | Good | Pass | Pass | Pass | Pass | NG |
| Light-off performance (Time [seconds] to reach 200° C.) | Good | Good | Good | Pass | NG | Good | Good | Good | Good | Good |
| Inlet open frontal area | Good | Good | Good | Pass | NG | Good | Good | Good | Pass | Good |
| Pressure loss at time of PM deposition | Good | Good | Good | Pass | Pass | Good | Good | Good | Good | Good |

Examples 2 to 12

"A diameter $D_0$ (mm) of an inscribed circle", "a diameter $D_1$ (mm) of an inscribed circle", "a diameter $D_2$ (mm) of an inscribed circle" and "a ratio of intersecting portions which satisfy Equation (1)" were changed as shown in Table 1 or Table 2, to manufacture plugged honeycomb structures of Examples 2 to 12.

Comparative Examples 1 to 4

"A diameter $D_0$ (mm) of an inscribed circle", "a diameter $D_1$ (mm) of an inscribed circle", "a diameter $D_2$ (mm) of an inscribed circle" and "a ratio of intersecting portions which satisfy Equation (1)" were changed as shown in Table 1 or Table 2, to manufacture plugged honeycomb structures of Comparative Examples 1 to 4.

The procedure of Example 1 was repeated except that $D_1=\sqrt{2}\times D_0$ in an intersecting portion of partition walls each defining inflow cells which were adjacent to each other, to prepare the plugged honeycomb structure of Comparative Example 1. That is, in the plugged honeycomb structure of Comparative Example 1, "a value of $D_1/(\sqrt{2}\times D_0)$" is 1.00.

As to the plugged honeycomb structures of Examples 1 to 12 and Comparative Examples 1 to 4, there were performed evaluations of "a thermal shock resistance", "a light-off performance", "an inlet open frontal area" and "a pressure loss at a time of PM deposition" by the following methods. Table 1 and Table 2 show the results.

[Thermal Shock Resistance]

A thermal shock resistance was evaluated by a hot vibration test. Specifically, a range of 130 mm from an outflow-side end face of the prepared plugged honeycomb structure was held with MAFTEC (trade name) manufactured by Mitsubishi Plastics, Inc. To the plugged honeycomb structure whose outflow-side end face was held in this manner, a vibration was applied at a vibration number of 100 Hz and an acceleration degree of 30 G, while passing air heated with a propane burner, to carry out the test for 100 hours. As conditions of the air heated in the hot vibration test, a flow rate was set to 2 Nm³/min and a temperature was set to 150 to 800° C. (for 20 minutes in one cycle). After the hot vibration test, it was visually confirmed whether or not partition walls of the plugged honeycomb structure were damaged. A case where any damages were not confirmed on the partition walls of the plugged honeycomb structure was evaluated as "good", a case where slight damages were confirmed was evaluated as "pass", and a case where serious damages were confirmed was evaluated as "NG (no good)". Table 1 and Table 2 show the results.

[Light-Off Performance (Time (Seconds) to Reach 200° C.)]

The evaluation of the light-off performance was performed by using the plugged honeycomb structure as a DPF, passing a burning gas at 400° C. into this DPF and measuring a time in which an outflow-side end portion of the DPF reached 200° C. Specifically, a ceramic non-thermal expansive mat was wound as a holding material around a circumference of the obtained plugged honeycomb structure, and the plugged honeycomb structure was pushed into a canning member made of stainless steel of SUS409 to obtain a canned structure. Furthermore, a K type of sheath thermocouple was disposed in an outflow-side end portion of the canned structure. Afterward, a diesel fuel was combusted to pass the burning gas at 400° C. into the structure, a temperature of the thermocouple disposed in advance was monitored, and the time (seconds) in which the temperature reached 200° C. was measured. Additionally, as the diesel fuel, light oil was used. In the evaluation of the light-off performance, the time (seconds) to reach 200° C. in the plugged honeycomb structure of Comparative Example 1 was used as a base and the evaluation was performed as follows. To the base, a case where the time (seconds) to reach 200° C. was +0.5 seconds or less was evaluated as "good". To the base, a case where the time (seconds) to reach 200° C. was in excess of +0.5 seconds and +1 second or less was evaluated as "pass". To the base, the time (seconds) to reach 200° C. was in excess of +1 second was evaluated as "NG (no good)".

[Inlet Open Frontal Area]

A ratio (%) of an area occupied by inflow cells in an inflow-side end face to an area of a cross section of the plugged honeycomb structure was measured. This area ratio (%) was defined as a ratio (%) of the inlet open frontal area of the plugged honeycomb structure. In the evaluation of the inlet open frontal area, the ratio (%) of the inlet open frontal area in the plugged honeycomb structure of Comparative Example 1 was used as a base, and the evaluation was performed as follows. To the base, a case where the ratio (%) of the inlet open frontal area was +1% or less was evaluated as "good". To the base, a case where the ratio (%) of the inlet open frontal area was in excess of +1% and +2% or less was evaluated as "pass". To the base, a case where the ratio (%) of the inlet open frontal area was in excess of +2% was evaluated as "NG (no good)".

[Pressure Loss at Time of PM Deposition]

A soot-containing burning gas was passed through the plugged honeycomb structure to deposit soot in the plugged honeycomb structure, and the pressure loss at the time of PM deposition of the plugged honeycomb structure was measured from a difference in pressure between an inflow side and an outflow side when an amount of the deposited soot was 4 g/L. Specifically, light oil was first burnt in a state of oxygen deficiency to prepare the burning gas in which the soot was generated. Then, dilution air was added to the burning gas in which an amount of the generated soot was 10 g/h and a flow rate was 2.4 Nm³/min at a temperature of 200° C., thereby adjusting the gas to prepare the soot-containing burning gas for the evaluation of the pressure loss at the time of PM deposition. This soot-containing burning gas was passed through the plugged honeycomb structure, and when the amount of the soot deposited in the plugged honeycomb structure reached 4 g/L, pressures of the inflow side and outflow side of this plugged honeycomb structure were measured, and the pressure difference was obtained as a pressure loss value at the time of PM deposition of the plugged honeycomb structure. In the evaluation of the pressure loss at the time of PM deposition, the pressure loss value of the plugged honeycomb structure of Comparative Example 1 was used as a base, and the evaluation was performed as follows. To the base, a case where increase of the pressure loss value was +4% or less was evaluated as "good". To the base, a case where the increase of the pressure loss value was in excess of +4% and +8% or less was evaluated as "pass". To the base, a case where the increase of the pressure loss value was in excess of +8% was evaluated as "NG (no good)".

[Result]

As shown in Table 1 and Table 2, in the plugged honeycomb structures of Examples 1 to 12, the evaluation result of "pass" or more was obtained in all of the evaluations of "the thermal shock resistance", "the light-off performance", "the inlet open frontal area" and "the pressure loss at the time of PM deposition". Especially, it has been found from the evaluation results of the plugged honeycomb structures of Examples 1 to 12 and Comparative Example 1 that when "the diameter $D_1$ (mm) of the inscribed circle" is larger than $\sqrt{2}$ times of "the diameter $D_0$ (mm) of the inscribed circle", the thermal shock resistance of the plugged honeycomb structure improves. Furthermore, in a case where a value of $D_1/(\sqrt{2} \times D_0)$ is other than 1.20 to 1.80 as in Comparative Examples 2 and 3, the result of no good is obtained in the evaluations of "the light-off performance" and "the inlet open frontal area". Therefore, it has been found that in a case where the value of $D_1/(\sqrt{2} \times D_0)$ is adjusted to be 1.20 to 1.80, all of "the thermal shock resistance", "the light-off performance", "the inlet open frontal area" and "the pressure loss at the time of PM deposition" improves as compared with Comparative Example 1.

Furthermore, it has been found that as the ratio of the intersecting portions satisfying Equation (1) decreases, the thermal shock resistance of the plugged honeycomb structure deteriorates, and in a case where the ratio is smaller than 60%, the thermal shock resistance noticeably deteriorates.

Furthermore, it has been found that when "the diameter $D_2$ (mm) of the inscribed circle" is from 0.20 to 0.80 mm, the evaluations of "the light-off performance", "the inlet open frontal area" and "the pressure loss at the time of PM deposition" are excellent, but when the diameter is in excess of 0.80 mm, the respective evaluations lower.

A plugged honeycomb structure of the present invention can be utilized as an exhaust gas purifying filter. The plugged honeycomb structure can be also utilized as a catalyst carrier obtained by loading a catalyst onto partition walls of the plugged honeycomb structure of the present invention.

DESCRIPTION OF REFERENCE NUMERALS

1: partition wall, 2: cell, 2a: inflow cell, 2b: outflow cell, 3: plugging portion, 3a: inflow-side plugging portion, 3b: outflow-side plugging portion, 4: intersecting portion, 6a: inflow-side end face, 6b: outflow-side end face, 7: honeycomb segment, 8: bonding layer, 9: honeycomb structure body, 11: circumferential wall, 100: plugged honeycomb structure, C: crack, and $D_0$ and $D_1$: circle diameter.

What is claimed is:

1. A plugged honeycomb structure comprising:
a honeycomb structure body having porous partition walls defining a plurality of cells which extends from an inflow-side end face to an outflow-side end face and becomes a through channel for a fluid;
inflow-side plugging portions disposed in open ends of predetermined inflow cells in the outflow-side end face; and
outflow-side plugging portions disposed in open ends of residual outflow cells in the inflow-side end face,
wherein in a cross section of the honeycomb structure body which is perpendicular to an extending direction of the cells, the inflow cells are disposed to surround the outflow cell, and the number of the inflow cells is larger than the number of the outflow cells,
the cross section has a plurality of intersecting portions of the partition walls each defining the inflow cells which are adjacent to each other, and
in 60% or more of a total number of the intersecting portions, a relation between a diameter $D_1$ of a circle inscribed in the intersecting portion and a diameter $D_0$ of a circle inscribed in the partition wall defining the inflow cell and the outflow cell which are adjacent to each other satisfies Equation (1) mentioned below:

$$D_1/(\sqrt{2} \times D_0) = 1.20 \text{ to } 1.80. \quad \text{Equation (1):}$$

2. The plugged honeycomb structure according to claim 1, wherein in the total number of the intersecting portions, the relation between the diameter $D_1$ of the circle inscribed in the intersecting portion and the diameter $D_0$ of the circle inscribed in the partition wall defining the inflow cell and the outflow cell which are adjacent to each other satisfies Equation (1).

3. The plugged honeycomb structure according to claim 1, wherein a diameter $D_2$ of a circle which is inscribed in the inflow cell and comes in contact with the partition wall on the side of the intersecting portion of the inflow cell is from 0.20 to 0.80 mm.

4. The plugged honeycomb structure according to claim 1, wherein only in the intersecting portion of the partition walls each defining the inflow cells which are adjacent to each other, the relation between the diameter $D_1$ of the circle inscribed in the intersecting portion and the diameter $D_0$ of the circle inscribed in the partition wall defining the inflow cell and the outflow cell which are adjacent to each other satisfies Equation (1).

* * * * *